United States Patent
Wan et al.

(10) Patent No.: US 10,754,943 B2
(45) Date of Patent: Aug. 25, 2020

(54) VIRTUAL MACHINE KERNEL PROTECTION METHOD AND APPARATUS

(71) Applicant: HUAWEI TECHNOLOGIES CO., LTD., Shenzhen (CN)

(72) Inventors: Rongfei Wan, Beijing (CN); Xingshu Chen, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 307 days.

(21) Appl. No.: 16/013,950

(22) Filed: Jun. 21, 2018

(65) Prior Publication Data

US 2018/0314822 A1 Nov. 1, 2018

Related U.S. Application Data

(63) Continuation of application No. PCT/CN2016/102069, filed on Oct. 14, 2016.

(30) Foreign Application Priority Data

Dec. 23, 2015 (CN) .......................... 2015 1 0980458

(51) Int. Cl.
*G06F 9/455* (2018.01)
*G06F 21/53* (2013.01)

(52) U.S. Cl.
CPC .......... *G06F 21/53* (2013.01); *G06F 9/45533* (2013.01); *G06F 9/45558* (2013.01);
(Continued)

(58) Field of Classification Search
None
See application file for complete search history.

(56) References Cited

U.S. PATENT DOCUMENTS 8,407,699 B2 * 3/2013 Larkin .................... G06F 9/468 718/1
9,189,630 B1 * 11/2015 Yudin ..................... G06F 21/53
(Continued)

FOREIGN PATENT DOCUMENTS

| CN | 101551756 A | 10/2009 |
| CN | 102129531 A | 7/2011 |

(Continued)

OTHER PUBLICATIONS

Abhinav Srivastava et al., "Efficient Monitoring of Untrusted Kernel-Mode Execution", Ndss, dated 2011, total 18 pages.

*Primary Examiner* — Bing Zhao
(74) *Attorney, Agent, or Firm* — Kilpatrick Townsend & Stockton LLP

(57) ABSTRACT

A virtual machine kernel protection method and apparatus are disclosed. The method includes: trapping a system call function initiated by an application program (S301); and pointing the system call function to a shadow kernel based on an offset value between a base address of an original kernel of a virtual machine and a base address of the shadow kernel, and determining a corresponding entry address of the system call function in the shadow kernel based on a shadow SSDT in the shadow kernel (S302), where the shadow kernel is constructed in a nonpaged pool of the original kernel of the virtual machine, and the shadow kernel is executable kernel code constructed based on an image file of the original kernel of the virtual machine.

20 Claims, 6 Drawing Sheets

---

Trap an interrupt handling function of a virtual machine — S401

Point the interrupt handling function to a shadow kernel based on an offset value between a base address of an original kernel and a base address of the shadow kernel, and determine a corresponding entry address of the interrupt handling function in the shadow kernel based on a shadow IDT in the shadow kernel — S402

(52) U.S. Cl.
CPC ............ *G06F 2009/45587* (2013.01); *G06F 2009/45591* (2013.01)

(56) References Cited

U.S. PATENT DOCUMENTS

| | | | |
|---|---|---|---|
| 9,336,036 B2* | 5/2016 | Dong | ................... G06F 9/45558 |
| 2007/0086622 A1 | 4/2007 | Sun et al. | |
| 2010/0306766 A1 | 12/2010 | Schneider | |
| 2015/0033227 A1* | 1/2015 | Lin | ................... G06F 9/45558 718/1 |

FOREIGN PATENT DOCUMENTS

| | | | |
|---|---|---|---|
| CN | 103955438 A | 7/2014 |
| CN | 103996004 A | 8/2014 |

\* cited by examiner

VIRTUAL MACHINE KERNEL PROTECTION METHOD AND APPARATUS

CROSS-REFERENCE TO RELATED APPLICATIONS

This application is a continuation of International Application No. PCT/CN2016/102069, filed on Oct. 14, 2016, which claims priority to Chinese Patent Application No. 201510980458.2, filed on Dec. 23, 2015, The disclosures of the aforementioned applications are hereby incorporated by reference in their entireties.

STATEMENT OF JOINT RESEARCH AGREEMENT

The subject matter and the claimed invention were made by or on the behalf of Sichuan University, of Wangjiang District, Chengdu, P.R. China and Huawei Technologies Co., Ltd., of Shenzhen, Guangdong Province, P.R. China, under a joint research agreement titled "Virtual Machine Kernel Protection Method and Apparatus". The joint research agreement was in effect on or before the claimed invention was made, and that the claimed invention was made as a result of activities undertaken within the scope of the joint research agreement.

TECHNICAL FIELD

The present invention relates to virtual machine technologies, and in particular, to a virtual machine kernel protection method and apparatus.

BACKGROUND

Cloud computing technologies have developed rapidly in recent years. Threats caused by numerous currently existing malicious programs and malicious code in a kernel to security of processes in virtual machines on a cloud platform cannot be ignored. A virtual machine kernel plays a core role in a virtual machine. During running of the virtual machine, system call requests of all application programs, internal and external interrupt handling, and the like are all directly processed in the virtual machine kernel, and the virtual machine kernel performs necessary processing. In some implementations, among all interfaces for accessing the virtual machine kernel, a system call interface is an important interface for the application programs to interact with the virtual machine kernel and further obtain services of the virtual machine kernel. Correspondingly, among path branches to the virtual machine kernel, a system call execution path is a path that needs to be particularly protected. Once the system call execution path is hijacked, malicious code may obtain an opportunity for execution in a process environment of a particular process, and then read/write a process memory in the process by using an authorized identity of the process, to break through restrictions on read/write of the process memory by a third-party process. Consequently, the malicious code may, for example, tamper results of system call execution, threaten security of data in processes, and affect normal running of the processes.

In the prior art, to perform anti-hijacking protection on the system call execution path, a virtual machine monitor (Virtual Machine Monitor, VMM for short) in the virtual machine mainly performs transparent interception and monitoring on the virtual machine kernel in real time, that is, performs interception and monitoring without being perceived by a user side, to intercept, in real time, reading and writing of the process memory by an unauthorized operation. Specifically, interception is implemented mainly by using an exception/trap mechanism provided by a hardware-assisted virtualization mechanism and a hardware-assisted memory virtualization mechanism. In the VMM, corresponding memory isolation is implemented by using page tables, to trap an unauthorized operation and perform processing in time.

However, according to the prior art, omission usually occurs when the VMM performs interception at a granularity of a page table. For example, if malicious code performs continuous operations on a particular page, once the malicious code is not intercepted and is allowed the first time, it is difficult to trap the malicious code subsequently. That is, an interception effect is relatively poor and overheads caused by real-time interception are excessively large.

SUMMARY

The present invention provides a virtual machine kernel protection method and apparatus, to resolve prior-art problems that a malicious code interception effect is poor and interception needs to be performed in real time.

A first aspect of the present invention provides a virtual machine kernel protection method, including:

trapping a system call function initiated by an application program; and pointing the system call function to a shadow kernel based on an offset value between a base address of an original kernel of a virtual machine and a base address of the shadow kernel, and determining a corresponding entry address of the system call function in the shadow kernel based on a shadow system service descriptor table SSDT in the shadow kernel, where the shadow kernel is constructed in a nonpaged pool of the original kernel of the virtual machine, and the shadow kernel is executable kernel code constructed based on an image file of the original kernel of the virtual machine.

Further, the foregoing method further includes: constructing the shadow kernel.

The constructing the shadow kernel may include:

repairing to-be-redirected data in the initial code of the shadow kernel based on an address mapped to the image file and the base address of the shadow kernel, to obtain repaired to-be-redirected data;

backing up data corresponding to an SSDT and data corresponding to a shadow interrupt descriptor table IDT in the repaired to-be-redirected data, to obtain the shadow IDT and the shadow SSDT; and redirecting the repaired to-be-redirected data to the original kernel of the virtual machine to obtain target to-be-redirected data, and replacing an SSDT and an IDT in the target to-be-redirected data with the shadow SSDT and the shadow IDT.

In some embodiments, before the copying a file of the original kernel of the virtual machine to obtain the image file, the method further includes:

applying for a buffer in the nonpaged pool of the original kernel of the virtual machine, where the shadow kernel is constructed in the buffer.

In some embodiments, the repairing to-be-redirected data in the initial code of the shadow kernel based on an address mapped to the image file and the base address of the shadow kernel, to obtain repaired to-be-redirected data includes:

repairing the to-be-redirected data in the initial code of the shadow kernel according to a formula $D_{actual}-$ $D_{actual\_imagebase} = D_{default} - D_{default\_imagebase}$, to obtain the repaired to-be-redirected data, where $D_{default}$ is an address of the to-be-redirected data, $D_{actual\_imagebase}$ is a starting address of the buffer, $D_{default\_imagebase}$ is the base address of the shadow kernel, and $D_{actual}$ is an address of the repaired to-be-redirected data.

Further, after the pointing the system call function to a shadow kernel, the method further includes:

intercepting a read/write operation performed by the application program on an SSDT in the original kernel of the virtual machine. Specifically, a VMM may be used to intercept the read/write operation performed by the application program on the SSDT in the original kernel, cheat detection code inside the virtual machine, and ignore modifications made by the application program to the SSDT in the original kernel.

In some embodiments, the SSDT in the original kernel of the virtual machine includes a correspondence between an identifier of the system call function and an entry address of the system call function in the original kernel of the virtual machine, and the shadow SSDT includes a correspondence between the identifier of the system call function and the entry address of the system call function in the shadow kernel; and correspondingly, the determining a corresponding entry address of the system call function in the shadow kernel based on a shadow SSDT in the shadow kernel may be: determining the corresponding entry address of the system call function in the shadow kernel based on the correspondence between the identifier of the system call function in the shadow SSDT and the entry address of the system call function in the shadow kernel.

Further, the method further includes:

trapping an interrupt handling function of the virtual machine; and pointing the interrupt handling function to the shadow kernel based on the offset value between the base address of the original kernel and the base address of the shadow kernel, and determining a corresponding entry address of the interrupt handling function in the shadow kernel based on the shadow IDT in the shadow kernel.

After the pointing the interrupt handling function to the shadow kernel, the method further includes:

intercepting a read/write operation performed by the application program on an IDT in the original kernel of the virtual machine.

Specifically, a base address of the shadow IDT is stored in an IDTR register and is used to perform entry addressing and distribution on the interrupt handling function, and the VMM is used to transparently store content of the IDTR in a specified address unit instruction for interception or trapping. After the read/write operation performed by the application program on the IDT in the original kernel is intercepted, a base address and size information of the IDT in the original kernel are returned for cheating.

In some embodiments, the IDT in the original kernel of the virtual machine includes a correspondence between an identifier of the interrupt handling function and an entry address of the interrupt handling function in the original kernel of the virtual machine, and the shadow IDT includes a correspondence between the identifier of the interrupt handling function and the entry address of the interrupt handling function in the shadow kernel; and correspondingly, the determining a corresponding entry address of the interrupt handling function in the shadow kernel based on the shadow IDT in the shadow kernel includes:

determining the corresponding entry address of the interrupt handling function in the shadow kernel based on the correspondence between the identifier of the interrupt handling function in the shadow IDT and the entry address of the interrupt handling function in the shadow kernel.

In some embodiments, the offset value between the base address of the original kernel of the virtual machine and the base address of the shadow kernel is a difference obtained by subtracting the base address of the shadow kernel form the base address of the original kernel of the virtual machine.

A second aspect of the present invention provides a virtual machine kernel protection apparatus, including:

a first trapping module, configured to trap a system call function initiated by an application program; and a first transfer module, configured to: point the system call function to a shadow kernel based on an offset value between a base address of an original kernel of a virtual machine and a base address of the shadow kernel, and determine a corresponding entry address of the system call function in the shadow kernel based on a shadow system service descriptor table SSDT in the shadow kernel, where the shadow kernel is constructed in a nonpaged pool of the original kernel of the virtual machine, and the shadow kernel is executable kernel code constructed based on an image file of the original kernel of the virtual machine.

Further, the apparatus further includes:

a construction module, configured to construct the shadow kernel.

The construction module includes:

a copying unit, configured to copy a file of the original kernel of the virtual machine to obtain the image file;

a mapping unit, configured to map the image file to the nonpaged pool of the original kernel of the virtual machine based on an executable format file, to form initial code of the shadow kernel;

a first redirection unit, configured to repair to-be-redirected data in the initial code of the shadow kernel based on an address mapped to the image file and the base address of the shadow kernel, to obtain repaired to-be-redirected data;

a backup unit, configured to back up data corresponding to an SSDT and data corresponding to a shadow interrupt descriptor table IDT in the repaired to-be-redirected data, to obtain the shadow IDT and the shadow SSDT; and a second redirection unit, configured to: redirect the repaired to-be-redirected data to the original kernel of the virtual machine to obtain target to-be-redirected data, and replace an SSDT and an IDT in the target to-be-redirected data with the shadow SSDT and the shadow IDT.

In some embodiments, the apparatus further includes:

an application module, configured to: before the copying unit copies the file of the original kernel of the virtual machine to obtain the image file, apply for a buffer in the nonpaged pool of the original kernel of the virtual machine, where the shadow kernel is constructed in the buffer.

In some embodiments, the first redirection unit is specifically configured to repair the to-be-redirected data in the initial code of the shadow kernel according to a formula $D_{actual} - D_{actual\_imagebase} = D_{default} - D_{default\_imagebase}$ to obtain the repaired to-be-redirected data, where $D_{default}$ is an address of the to-be-redirected data, $D_{actual\_imagebase}$ is a starting address of the buffer, $D_{default\_imagebase}$ is the base address of the shadow kernel, and $D_{actual}$ is an address of the repaired to-be-redirected data.

Further, the apparatus further includes:

a first interception module, configured to intercept a read/write operation performed by the application program on an SSDT in the original kernel of the virtual machine.

In some embodiments, the SSDT in the original kernel of the virtual machine includes a correspondence between an identifier of the system call function and an entry address of the system call function in the original kernel of the virtual machine, and the shadow SSDT includes a correspondence between the identifier of the system call function and the entry address of the system call function in the shadow kernel; and correspondingly, the first transfer module is specifically configured to determine the corresponding entry address of the system call function in the shadow kernel based on the correspondence between the identifier of the system call function in the shadow SSDT and the entry address of the system call function in the shadow kernel.

Further, the apparatus further includes:

a second trapping module, configured to trap an interrupt handling function of the virtual machine; and a second transfer module, configured to: point the interrupt handling function to the shadow kernel based on the offset value between the base address of the original kernel and the base address of the shadow kernel, and determine a corresponding entry address of the interrupt handling function in the shadow kernel based on the shadow IDT in the shadow kernel.

The apparatus further includes:

a second interception module, configured to intercept a read/write operation performed by the application program on an IDT in the original kernel of the virtual machine.

The IDT in the original kernel of the virtual machine includes a correspondence between an identifier of the interrupt handling function and an entry address of the interrupt handling function in the original kernel of the virtual machine, and the shadow IDT includes a correspondence between the identifier of the interrupt handling function and the entry address of the interrupt handling function in the shadow kernel; and correspondingly, the second transfer module is specifically configured to determine the corresponding entry address of the interrupt handling function in the shadow kernel based on the correspondence between the identifier of the interrupt handling function in the shadow IDT and the entry address of the interrupt handling function in the shadow kernel.

A third aspect of the present invention provides a virtual machine kernel protection apparatus, including: a processor, an interface circuit, a memory, and a bus, where the processor, the interface circuit, and the memory are connected and communicate with each other by using the bus, the memory stores a set of program code, and the processor invokes program code stored in the memory to perform the following operations:

trapping a system call function initiated by an application program; and pointing the system call function to a shadow kernel based on an offset value between a base address of an original kernel of a virtual machine and a base address of the shadow kernel, and determining a corresponding entry address of the system call function in the shadow kernel based on a shadow system service descriptor table SSDT in the shadow kernel, where the shadow kernel is constructed in a nonpaged pool of the original kernel of the virtual machine, and the shadow kernel is executable kernel code constructed based on an image file of the original kernel of the virtual machine.

Further, the processor is further configured to construct the shadow kernel. Specifically, the processor is configured to perform the following operations: copying a file of the original kernel of the virtual machine to obtain the image file;

mapping the image file to the nonpaged pool of the original kernel of the virtual machine based on an executable format file, to form initial code of the shadow kernel;

repairing to-be-redirected data in the initial code of the shadow kernel based on an address mapped to the image file and the base address of the shadow kernel, to obtain repaired to-be-redirected data;

backing up data corresponding to an SSDT and data corresponding to a shadow interrupt descriptor table IDT in the repaired to-be-redirected data, to obtain the shadow IDT and the shadow SSDT; and redirecting the repaired to-be-redirected data to the original kernel of the virtual machine to obtain target to-be-redirected data, and replacing an SSDT and an IDT in the target to-be-redirected data with the shadow SSDT and the shadow IDT.

In some embodiments, before copying the file of the original kernel of the virtual machine to obtain the image file, the processor applies for a buffer in the nonpaged pool of the original kernel of the virtual machine, where the shadow kernel is constructed in the buffer.

That the processor repairs the to-be-redirected data in the initial code of the shadow kernel according to the address mapped to the image file and the base address of the shadow kernel, to obtain the repaired to-be-redirected data may be: repairing the to-be-redirected data in the initial code of the shadow kernel according to a formula $D_{actual} - D_{actual\_imagebase} = D_{default} - D_{default\_imagebase}$, to obtain the repaired to-be-redirected data, where $D_{default}$ is an address of the to-be-redirected data, $D_{actual\_imagebase}$ is a starting address of the buffer, $D_{default\_imagebase}$ is the base address of the shadow kernel, and $D_{actual}$ is an address of the repaired to-be-redirected data.

After pointing the system call function to the shadow kernel, the processor is further configured to intercept a read/write operation performed by the application program on an SSDT in the original kernel of the virtual machine.

The SSDT in the original kernel of the virtual machine includes a correspondence between an identifier of the system call function and an entry address of the system call function in the original kernel of the virtual machine, and the shadow SSDT includes a correspondence between the identifier of the system call function and the entry address of the system call function in the shadow kernel; and correspondingly, the processor is specifically configured to determine the corresponding entry address of the system call function in the shadow kernel based on the correspondence between the identifier of the system call function in the shadow SSDT and the entry address of the system call function in the shadow kernel.

Further, the processor is further configured to: trap an interrupt handling function of the virtual machine; and point the interrupt handling function to the shadow kernel based on the offset value between the base address of the original kernel and the base address of the shadow kernel, and determine a corresponding entry address of the interrupt handling function in the shadow kernel based on the shadow IDT in the shadow kernel.

After pointing the interrupt handling function to the shadow kernel, the processor is further configured to intercept a read/write operation performed by the application program on an IDT in the original kernel of the virtual machine.

The IDT in the original kernel of the virtual machine includes a correspondence between an identifier of the interrupt handling function and an entry address of the interrupt handling function in the original kernel of the virtual machine, and the shadow IDT includes a correspondence between the identifier of the interrupt handling function and the entry address of the interrupt handling function in the shadow kernel; and correspondingly, the processor is specifically configured to determine the corresponding entry address of the interrupt handling function in the shadow kernel based on the correspondence between the identifier of the interrupt handling function in the shadow IDT and the entry address of the interrupt handling function in the shadow kernel.

In the virtual machine kernel protection method and apparatus provided in the embodiments of the present invention, the system call function initiated by the application program is trapped; and the system call function is pointed to the shadow kernel based on the offset value between the base address of the original kernel of the virtual machine and the base address of the shadow kernel, and the corresponding entry address of the system call function in the shadow kernel is determined based on the shadow SSDT in the shadow kernel. A system call path is completely executed in pure code of the shadow kernel, so that completeness of the system call path is ensured, thereby ensuring completeness of running of entire kernel code. Moreover, it is easy to implement construction of the shadow kernel in the nonpaged pool of the original kernel of the virtual machine, and is more secure because no trace is left in other places such as a registry.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Embodiments of the present invention are applied to a virtual machine platform. The virtual machine platform may have two modes of deployment architectures.

Figure 1:
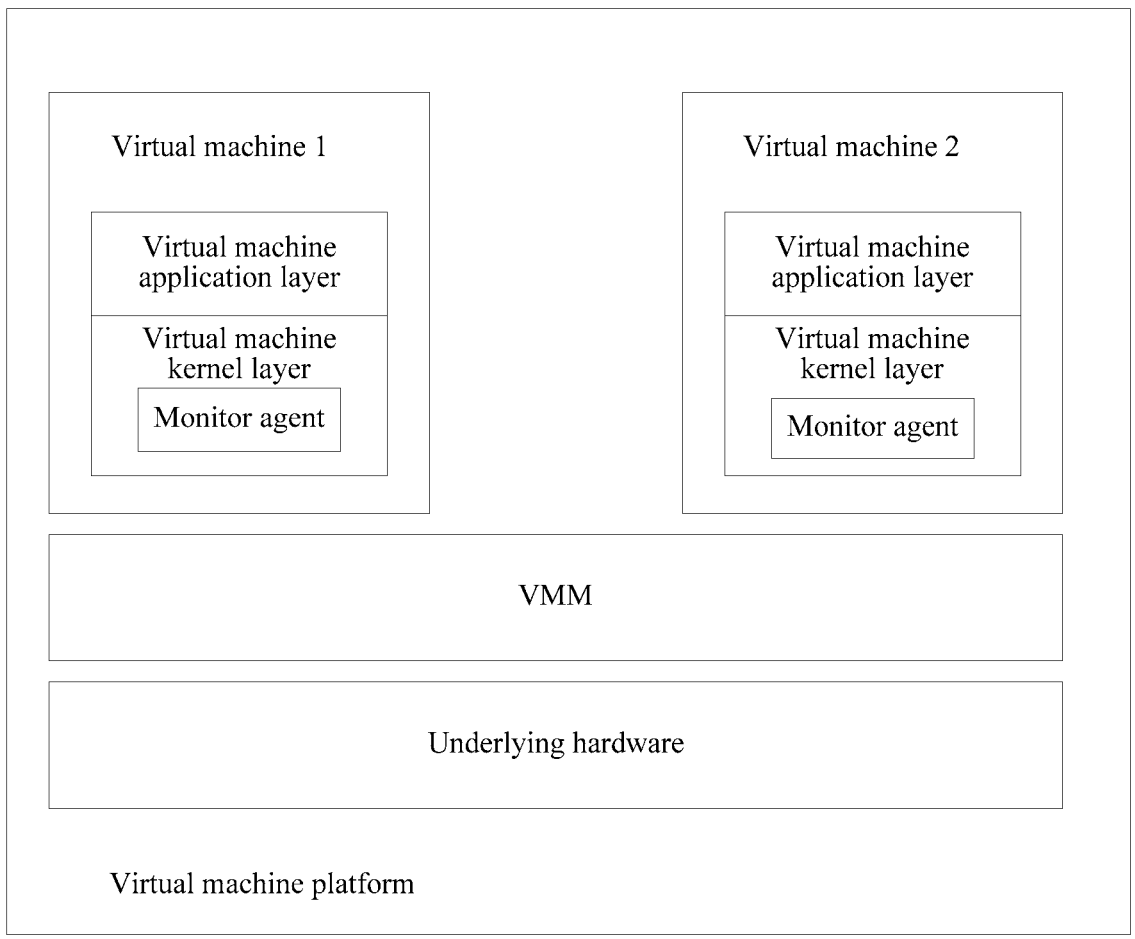
FIG. 1 is a schematic architectural diagram of Embodiment 1 of a virtual machine platform according to the present invention.

FIG. 1 is a schematic architectural diagram of Embodiment 1 of a virtual machine platform according to the present invention. FIG. 1 shows a bare-metal mode of the virtual machine platform. As shown in FIG. 1, the virtual machine platform may include a plurality of virtual machines (for example, a virtual machine 1 and a virtual machine 2 in FIG. 1), a lower layer of a virtual machine includes a VMM, and a lower layer of the VMM includes underlying hardware. The virtual machine includes a virtual machine application layer and a virtual machine kernel layer. In the present invention, the virtual machine kernel layer further includes a monitor agent.

Figure 2:
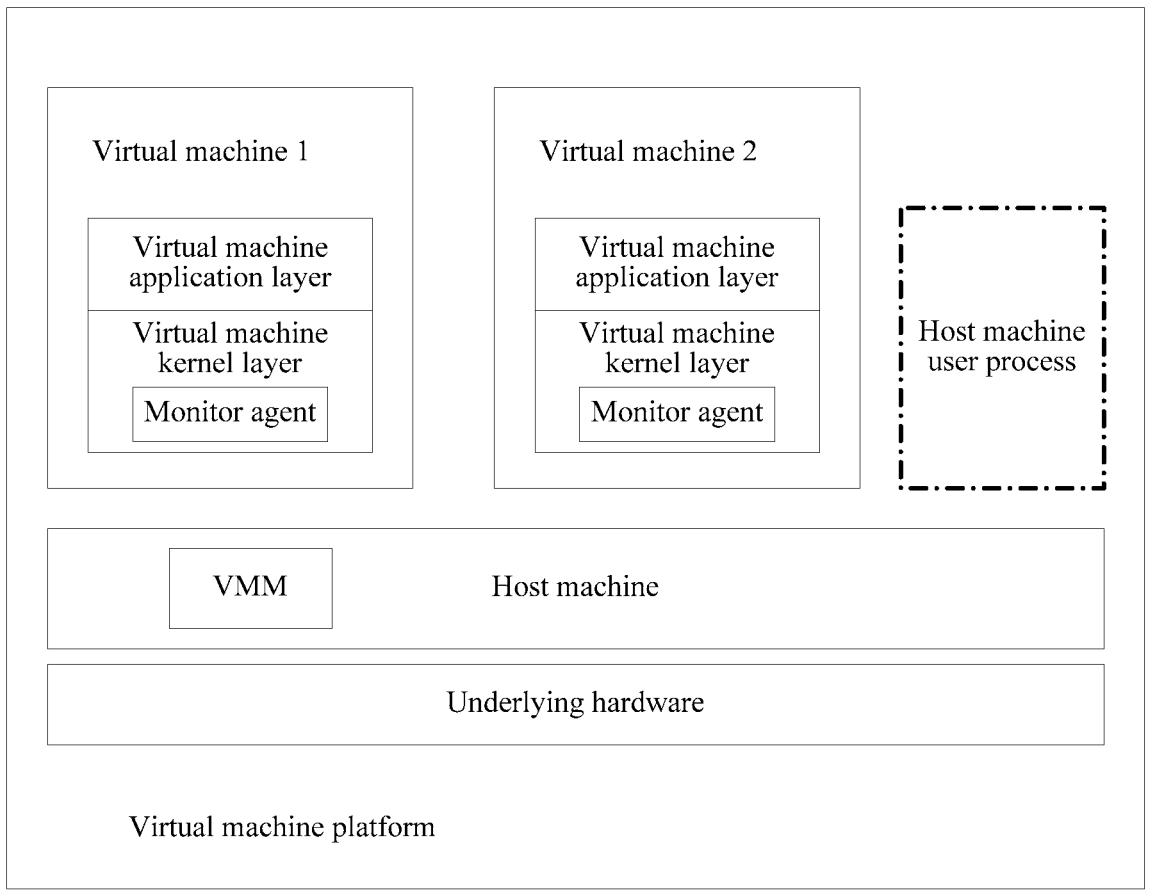
FIG. 2 is a schematic architectural diagram of Embodiment 2 of a virtual machine platform according to the present invention.

FIG. 2 is a schematic architectural diagram of Embodiment 2 of a virtual machine platform according to the present invention. FIG. 2 shows a host mode of the virtual machine platform. As shown in FIG. 2, the virtual machine platform may include a plurality of virtual machines (for example, a virtual machine 1 and a virtual machine 2 in FIG. 2). A common host machine user process may be included on a same layer as the virtual machine. A lower layer of the virtual machine includes a host machine, and a VMM runs on an operating system of the host machine. A lower layer of the host machine includes underlying hardware, and in the host mode, the host machine directly controls the underlying hardware. The virtual machine includes a virtual machine application layer and a virtual machine kernel layer. In the present invention, the virtual machine kernel layer further includes a monitor agent.

Figure 3:
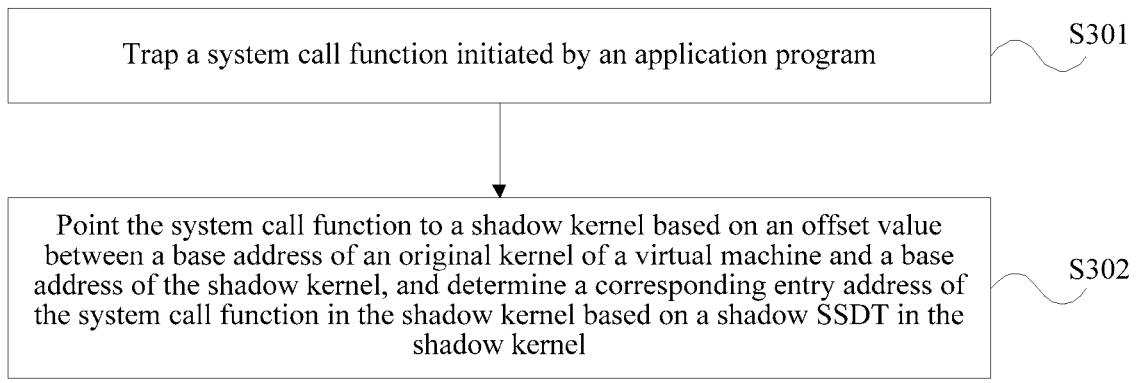
FIG. 3 is a schematic flowchart of Embodiment 1 of a virtual machine kernel protection method according to the present invention.

FIG. 3 is a schematic flowchart of Embodiment 1 of a virtual machine kernel protection method according to the present invention. The method may be performed by a virtual machine platform. As shown in FIG. 3, the method includes the following steps.

S301. Trap a system call function initiated by an application program.

The system call function is used to request to complete relevant processing of system call.

S302. Point the system call function to a shadow kernel based on an offset value between a base address of an original kernel of a virtual machine and a base address of the shadow kernel, and determine a corresponding entry address of the system call function in the shadow kernel based on a shadow system service descriptor table (System service descriptor table, SSDT for short) in the shadow kernel.

The shadow kernel is constructed in a nonpaged pool of the original kernel of the virtual machine, and the shadow kernel is executable kernel code constructed based on an image file of the original kernel of the virtual machine.

The offset value between the base address of the original kernel of the virtual machine and the base address of the shadow kernel is fixed and may be obtained by subtracting the base address of the shadow kernel from the base address of the original kernel.

In this embodiment, after the system call function initiated by the application program is trapped, processing is not performed in the original kernel of the virtual machine but the system call function of the application program is pointed to the shadow kernel, and the shadow kernel performs necessary processing. The shadow kernel herein is executable kernel code constructed based on the image file of the original kernel, and the executable code is pure kernel code.

In some implementations, the system call function is pointed to the shadow kernel by transparently setting rapid system call on a VMM layer, and the corresponding entry address of the system call function in the shadow kernel is determined based on the shadow SSDT in the shadow kernel.

In this embodiment, the system call function initiated by the application program is trapped; and the system call function is pointed to the shadow kernel based on the offset value between the base address of the original kernel of the virtual machine and the base address of the shadow kernel, and the corresponding entry address of the system call function in the shadow kernel is determined based on the shadow SSDT in the shadow kernel. A system call path is completely executed in pure code of the shadow kernel, so that completeness of the system call path is ensured, thereby ensuring completeness of running of entire kernel code. Moreover, it is easy to implement construction of the shadow kernel in the nonpaged pool of the original kernel of the virtual machine, and is more secure because no trace is left in other places such as a registry.

After the system call function is pointed to the shadow kernel, a read/write operation performed by the application program on an SSDT in the original kernel of the virtual machine may be intercepted.

In some implementations, after the system call function is pointed to the shadow kernel, a VMM may be used to intercept the read/write operation performed by the application program on the SSDT in the original kernel, cheat detection code inside the virtual machine, and ignore modifications made by the application program to the SSDT in the original kernel. Therefore, it can be ensured that a system call path is completely executed in the shadow kernel, thereby ensuring completeness of the system call path. Specifically, a read/write trap of a system call entry of the virtual machine may be set. If a third-party application program performs a read/write operation on the SSDT in the original kernel, the SSDT in the original kernel is returned to the application program, the detection code inside the virtual machine is cheated, and the modifications made by the application program to the SSDT in the original kernel are ignored.

The SSDT in the original kernel of the virtual machine includes a correspondence between an identifier of the system call function and an entry address of the system call function in the original kernel of the virtual machine, and the shadow SSDT includes a correspondence between the identifier of the system call function and the entry address of the system call function in the shadow kernel.

Correspondingly, the determining a corresponding entry address of the system call function in the shadow kernel based on a shadow SSDT in the shadow kernel may be: determining the corresponding entry address of the system call function in the shadow kernel based on the correspondence between the identifier of the system call function in the shadow SSDT and the entry address of the system call function in the shadow kernel.

The identifier of the system call function may be a number of the system call function, but is not limited thereto.

Figure 4:
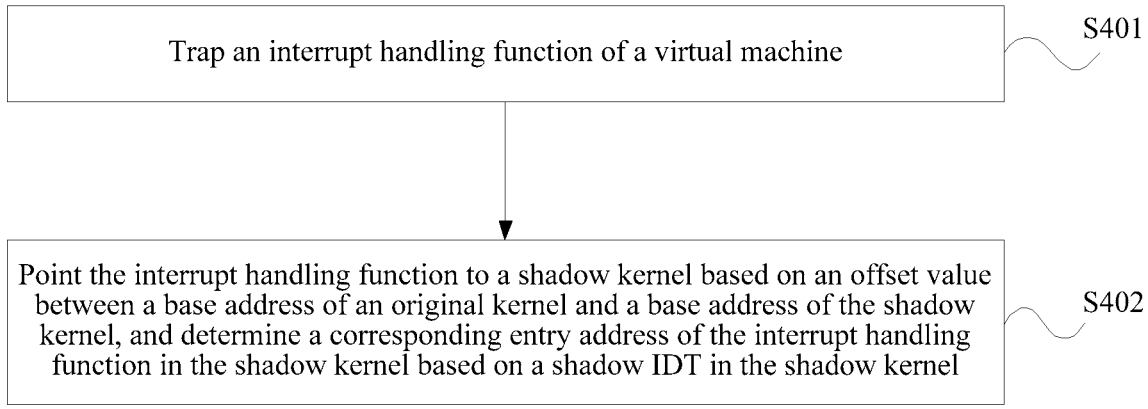
FIG. 4 is a schematic flowchart of Embodiment 2 of a virtual machine kernel protection method according to the present invention.

FIG. 4 is a schematic flowchart of Embodiment 2 of a virtual machine kernel protection method according to the present invention. In some embodiments, a virtual machine platform may perform processing on internal or external interrupt handling of a virtual machine that is the same as that in the foregoing system call. Specifically, S401. Trap an interrupt handling function of the virtual machine.

The interrupt handling function may be an interrupt handling function initiated inside or outside the virtual machine, and is used to request to perform interrupt handling inside or outside the virtual machine.

S402. Point the interrupt handling function to the shadow kernel based on the offset value between the base address of the original kernel and the base address of the shadow kernel, and determine a corresponding entry address of the interrupt handling function in the shadow kernel based on the shadow interrupt descriptor table (Interrupt Descriptor Table, IDT for short) in the shadow kernel.

Then, the interrupt handling function is transferred to the shadow kernel for processing, thereby ensuring completeness of interrupt handling.

Further, after the interrupt handling function is pointed to the shadow kernel, a read/write operation performed by the application program on an IDT in the original kernel of the virtual machine may be intercepted.

In some implementations, an interrupt descriptor table register (Interrupt Descriptor Table Register, IDTR for short) value at which a base address of the shadow IDT is stored before a VMM runs the virtual machine each time, so that the IDTR register includes the base address of the shadow IDT, and entry addressing and distribution may be performed on the interrupt handling function. In addition, the VMM is used to transparently store content of the IDTR in a specified address unit instruction (Store Interrupt Descriptor Table Register, SIDT instruction for short) for interception and trapping. Once it is found that a suspicious third-party application program performs a read/write operation on the IDT in the original kernel, a base address and size information of the IDT in the original kernel are returned for cheating, and a modification operation of the third-party application program is ignored, so that the read/write operation on the IDT in the original kernel is intercepted. Moreover, the IDTR register uses the base address of the shadow IDT table, so that it is ensured that all interrupt handling processes can be performed on shadow kernel code, thereby ensuring completeness of an entire procedure.

The IDT in the original kernel of the virtual machine includes a correspondence between an identifier of the interrupt handling function and an entry address of the interrupt handling function in the original kernel of the virtual machine. The shadow IDT includes a correspondence between the identifier of the interrupt handling function and the entry address of the interrupt handling function in the shadow kernel.

Correspondingly, the determining a corresponding entry address of the interrupt handling function in the shadow kernel based on the shadow IDT in the shadow kernel may be: determining the corresponding entry address of the interrupt handling function in the shadow kernel based on the correspondence between the identifier of the interrupt handling function in the shadow IDT and the entry address of the interrupt handling function in the shadow kernel.

The identifier of the interrupt handling function may be an interrupt number of the interrupt handling function.

It should be noted that not all system call functions and interrupt handling functions need to be pointed to the shadow kernel, only corresponding protected system call functions and interrupt handling functions may be transferred to the shadow kernel for processing, and others may be directly processed in the original kernel. Specifically, system call functions and interrupt handling functions that need to be protected may be set in advance. This is not limited herein.

Figure 5:
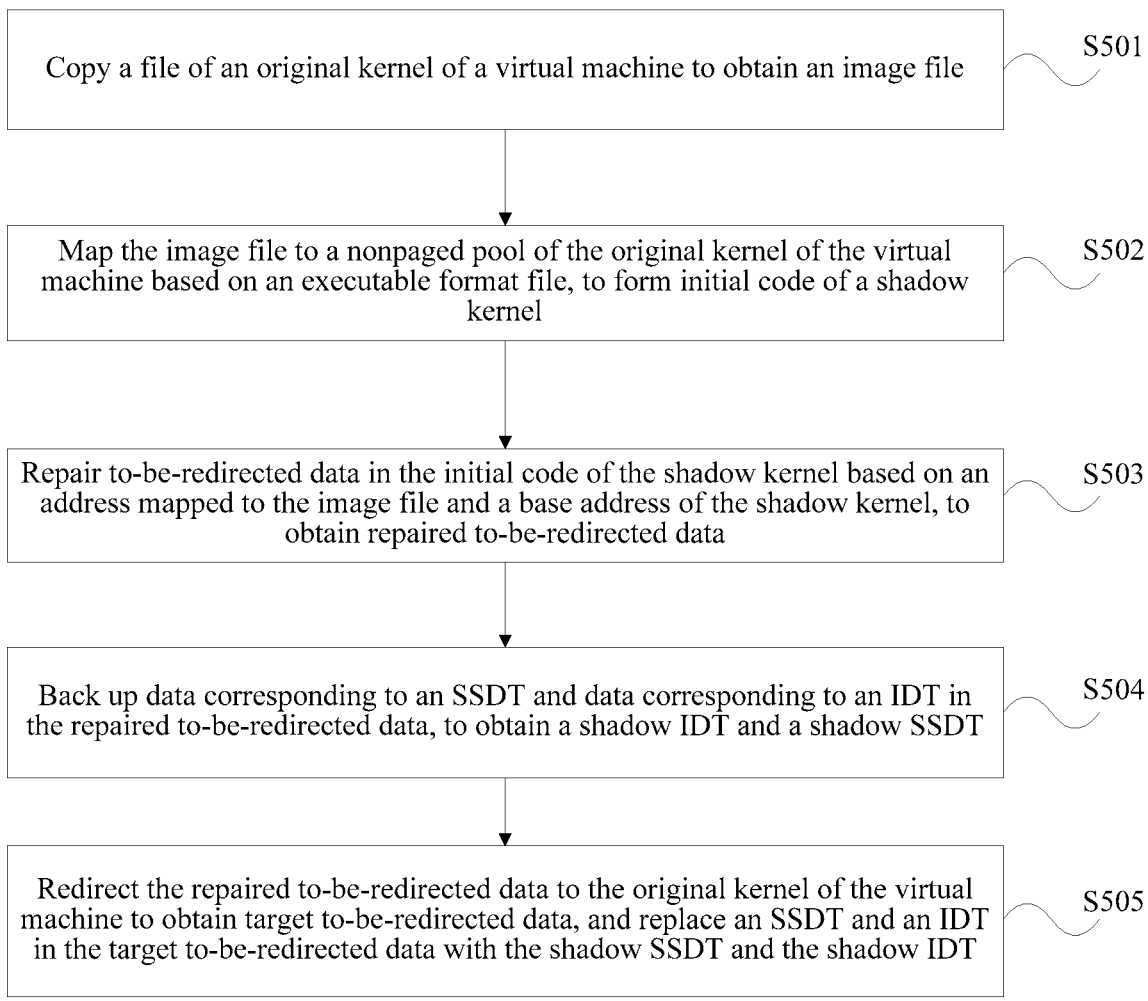
FIG. 5 is a schematic flowchart of Embodiment 3 of a virtual machine kernel protection method according to the present invention.

FIG. 5 is a schematic flowchart of Embodiment 3 of a virtual machine kernel protection method according to the present invention. Based on the foregoing embodiment, before the trapping a system call function initiated by an application program, the method further includes constructing the shadow kernel.

Specifically, a monitor agent module on a virtual machine platform may complete construction of the shadow kernel. After constructing the shadow kernel, the monitor agent module transfers, to the VMM, related information of the shadow kernel including information such as the base addresses of the shadow SSDT and the shadow IDT, to facilitate the VMM to perform an interception operation subsequently.

As shown in FIG. 5, a method for constructing the shadow kernel includes the following steps.

S501. Copy a file of the original kernel of the virtual machine to obtain the image file.

S502. Map the image file to the nonpaged pool of the original kernel of the virtual machine based on an executable format file, to form initial code of the shadow kernel.

In this embodiment, using a Windows system as an example, a corresponding executable format is a Windows portable executable (Portable Executable, PE for short) file format. However, the executable format is not limited thereto. If another operating system is used, a corresponding executable file format is used.

In some implementations, the original kernel is started first, the file of the original kernel is read and copied to obtain the image file of the original kernel, and the image file is mapped, based on the executable format, to a location at which the shadow kernel is constructed. For example, the image file is mapped to the nonpaged pool of the original kernel of the virtual machine based on the executable format. Specifically, the reading the file of the original kernel includes reading content such as a base address and a size of the file in the original kernel.

S503. Repair to-be-redirected data in the initial code of the shadow kernel based on an address mapped to the image file and the base address of the shadow kernel, to obtain repaired to-be-redirected data.

During construction of the shadow kernel, the original kernel of the virtual machine may already start to be run. Therefore, some kernel data, for example, some global time data and performance calculation-related data, of the original kernel is no longer content after initialization.

When mapped to the nonpaged pool of the original kernel of the virtual machine based on the executable format, the image file may be loaded to a random virtual address instead of a default base address of the shadow kernel. Therefore, redirection needs to be performed, and the repaired to-be-redirected data points to a corresponding address in the shadow kernel.

Data that needs to be redirected is identified in a redirection table in the foregoing executable format file.

In some implementations, an address $D_{default}$ of the to-be-redirected data may be obtained based on the redirection table in the executable format file, to obtain a starting address of the location at which the shadow kernel is constructed, for example, a starting address $D_{actual\_imagebase}$ of a buffer that is applied for in the nonpaged pool and at which the shadow kernel is constructed. $D_{actual\_imagebase}$ is an address to which the image file is actually loaded based on the executable format, and then an address $D_{actual}$ of the repaired to-be-redirected data is calculated based on the default base address $D_{default\_imagebase}$ that is of the executable format file and at which the shadow kernel is constructed.

An offset between relative base addresses of the to-be-redirected data is fixed before and after redirection. Therefore, based on the principle, a formula may be specifically used:

$$D_{actual} - D_{actual\_imagebase} = D_{default} - D_{default\_imagebase}$$

After a piece of to-be-redirected data is repaired, a current address of a next piece of to-be-redirected data is obtained from the redirection table to complete repairing of the next piece of to-be-redirected data. The process is repeated until all to-be-redirected data is repaired to form the repaired to-be-redirected data.

S504. Back up data corresponding to an SSDT and data corresponding to an IDT in the repaired to-be-redirected data, to obtain the shadow SSDT and the shadow IDT.

The to-be-redirected data includes the SSDT and the IDT, and all pieces of the repaired to-be-redirected data are pointed to corresponding addresses in the shadow kernel. For example, entry addresses corresponding to identifiers of system call functions in the SSDT all change to addresses in the shadow kernel, addresses corresponding to identifiers of interrupt handling functions in the IDT all change to addresses in the shadow kernel, and an address corresponding to an identifier of a current system call function and an address corresponding to an identifier of an interrupt handling function are written to a back-up array for backup, to construct the shadow SSDT and the shadow IDT.

In some implementations, the base address of the SSDT and the base address of the IDT in the to-be-redirected data are obtained first, and the data corresponding to the SSDT and the data corresponding to the IDT in the repaired to-be-redirected data are backed up based on the base address of the SSDT and the base address of the IDT in the repaired to-be-redirected data.

Using an example for description, the base address of the SSDT in the repaired to-be-redirected data is determined according to the following formula: NewSSDTBaseAddr=OrigSSDTBaseAddr+delta, where NewSSDTBaseAddr represents the base address of the SSDT in the repaired to-be-redirected data, OrigSSDTBaseAddr represents a base address of an SSDT in the original kernel, and $^{delta}$ represents an offset value between the base address of the original kernel and the base address of the shadow kernel.

A method for determining the base address of the IDT in the repaired to-be-redirected data is similar to a method for determining the base address of the SSDT in the repaired to-be-redirected data, and details are not described herein again.

S505. Redirect the repaired to-be-redirected data to the original kernel of the virtual machine to obtain target to-be-redirected data, and replace an SSDT and an IDT in the target to-be-redirected data with the shadow SSDT and the shadow IDT.

Because original kernel data is normal data after kernel initialization and running and may change during running. Data read when the shadow kernel is constructed is only data just after initialization, and the repaired to-be-redirected data still has some data that is not initialized. The data is initialized only when the data is invoked the first time. However, corresponding data in the original kernel may have been invoked and initialized. Therefore, the repaired to-be-redirected data needs to be redirected again to the original kernel. In this way, the shadow kernel can normally run, thereby avoiding blue screen of death of a system caused by an error in referencing global kernel data.

The repaired to-be-redirected data after redirection are all pointed to the original kernel again. The addresses corresponding to the identifiers of the system call functions in the SSDT change to addresses in the original kernel. Similarly, the addresses corresponding to the identifiers of the interrupt handling functions in the IDT change to addresses in the original kernel. However, the SSDT and the IDT in the shadow kernel need to be replaced with the shadow SSDT and the shadow IDT in S503, so that the addresses of the system call functions in the shadow SSDT are pointed to corresponding addresses in the shadow kernel, and the interrupt handling functions in the IDT are pointed to corresponding addresses in the shadow kernel.

Further, before step S501, the method may further include: applying for a buffer in the nonpaged pool of the original kernel of the virtual machine.

It should be noted that before the shadow kernel is constructed and after the virtual machine kernel is loaded completely, the virtual machine platform performs an initialization function, to obtain the base address of the original kernel and the entry address of the system call function in the original kernel, and then sets up the buffer for storing the image file of the original kernel in the nonpaged pool of the original kernel of the virtual machine and completes the construction of the shadow kernel in the buffer.

According to the method for constructing the shadow kernel in this embodiment of the present invention, only one buffer needs to be applied for to construct the shadow kernel, and during the construction, only an executable format of a file needs to be parsed by using a basic principle of an operating system, and then the construction of the shadow kernel is completed through simple copying and mapping. The implementation method is simple, universal, and readily applicable to various operating systems. Moreover, in the entire construction process, the shadow kernel never appears in a registry, a drive chain table, or an object directory of the system. The shadow kernel is desirably concealed and is not easy to be found and attacked by a third-party application program.

Figure 6:
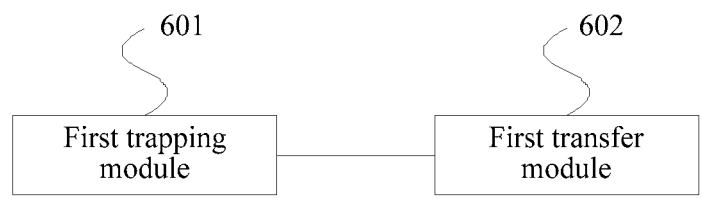
FIG. 6 is a schematic structural diagram of Embodiment 1 of a virtual machine kernel protection apparatus according to the present invention.

FIG. 6 is a schematic structural diagram of Embodiment 1 of a virtual machine kernel protection apparatus according to the present invention. The apparatus may be integrated into a virtual machine platform. As shown in FIG. 6, the apparatus includes a first trapping module 601 and a first transfer module 602.

The first trapping module 601 is configured to trap a system call function initiated by an application program.

The first transfer module 602 is configured to: point the system call function to a shadow kernel based on an offset value between a base address of an original kernel of a virtual machine and a base address of the shadow kernel, and determine a corresponding entry address of the system call function in the shadow kernel based on a shadow SSDT in the shadow kernel.

The shadow kernel is constructed in a nonpaged pool of the original kernel of the virtual machine, and the shadow kernel is executable kernel code constructed based on an image file of the original kernel of the virtual machine.

In this embodiment, the system call function initiated by the application program is trapped; and the system call function is pointed to the shadow kernel based on the offset value between the base address of the original kernel of the virtual machine and the base address of the shadow kernel, and the corresponding entry address of the system call function in the shadow kernel is determined based on the shadow SSDT in the shadow kernel. A system call path is completely executed in pure code of the shadow kernel, so that completeness of the system call path is ensured, thereby ensuring completeness of running of entire kernel code. Moreover, it is easy to implement construction of the shadow kernel in the nonpaged pool of the original kernel of the virtual machine, and is more secure because no trace is left in other places such as a registry.

Figure 7:
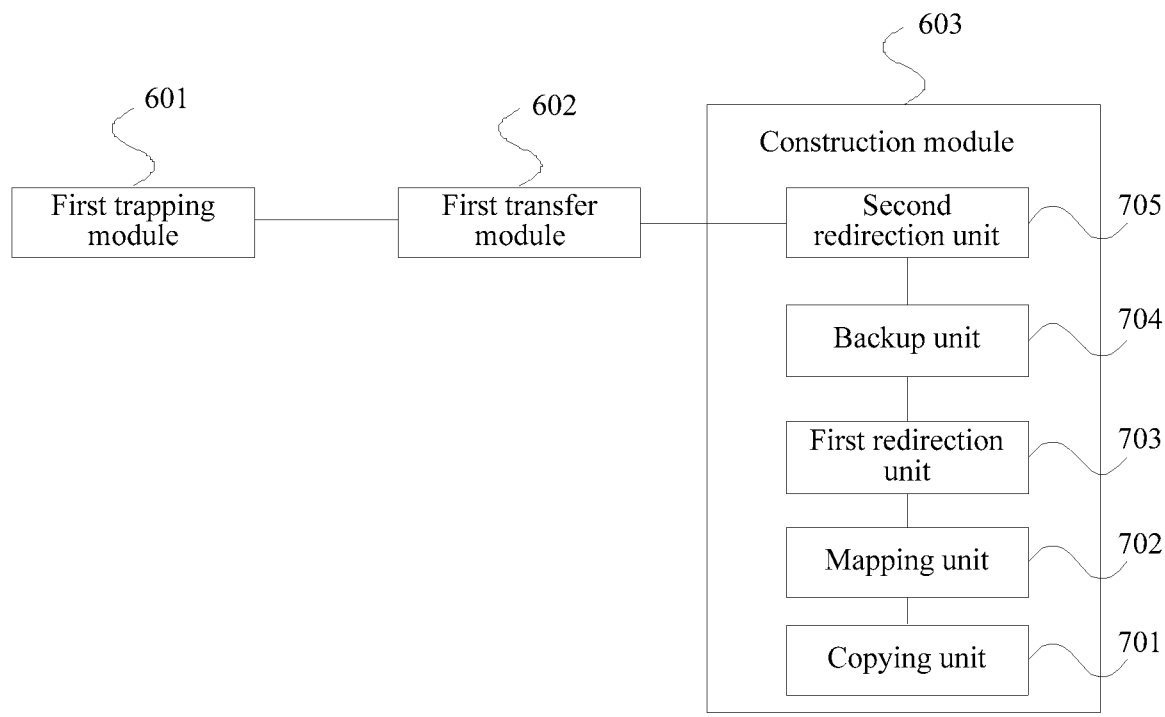
FIG. 7 is a schematic structural diagram of Embodiment 2 of a virtual machine kernel protection apparatus according to the present invention.

FIG. 7 is a schematic structural diagram of Embodiment 2 of a virtual machine kernel protection apparatus according to the present invention. As shown in FIG. 7, based on FIG. 6, the apparatus may further include a construction module 603, configured to construct the shadow kernel.

Referring to FIG. 7, in this embodiment, the construction module 603 includes: a copying unit 701, a mapping unit 702, a first redirection unit 703, a backup unit 704, and a second redirection unit 705.

The copying unit 701 is configured to copy a file of the original kernel of the virtual machine to obtain the image file.

The mapping unit 702 is configured to map the image file to the nonpaged pool of the original kernel of the virtual machine based on an executable format file, to form initial code of the shadow kernel.

The first redirection unit 703 is configured to repair to-be-redirected data in the initial code of the shadow kernel based on an address mapped to the image file and the base address of the shadow kernel, to obtain repaired to-be-redirected data.

The backup unit 704 is configured to back up data corresponding to an SSDT and data corresponding to a shadow interrupt descriptor table IDT in the repaired to-be-redirected data, to obtain the shadow IDT and the shadow SSDT.

The second redirection unit 705 is configured to: redirect the repaired to-be-redirected data to the original kernel of the virtual machine to obtain target to-be-redirected data, and replace an SSDT and an IDT in the target to-be-redirected data with the shadow SSDT and the shadow IDT.

Figure 8:
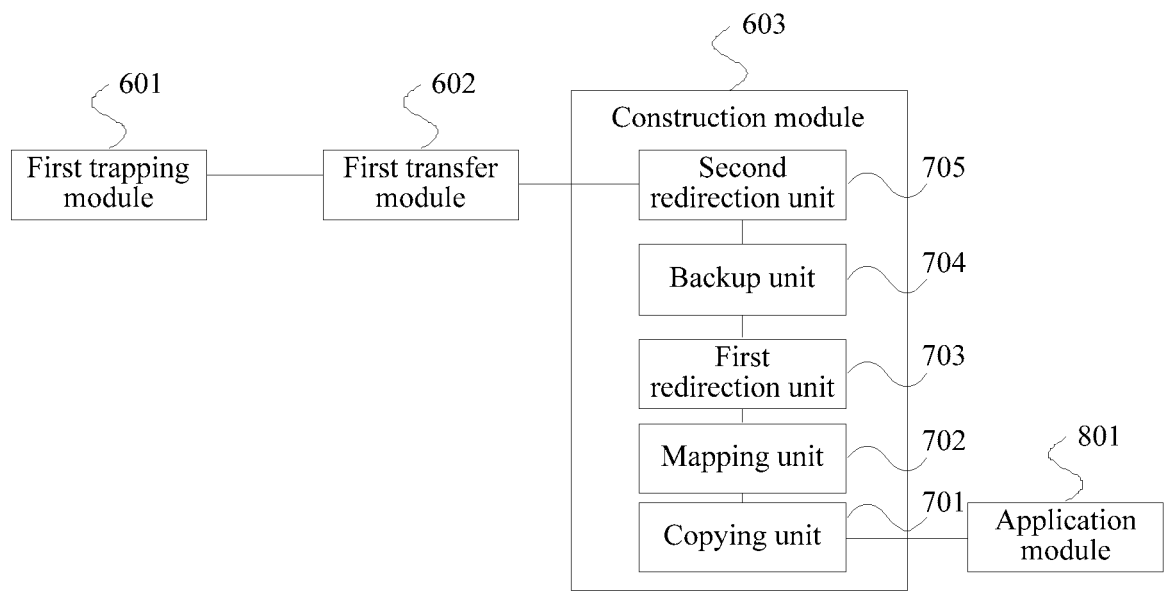
FIG. 8 is a schematic structural diagram of Embodiment 3 of a virtual machine kernel protection apparatus according to the present invention.

FIG. 8 is a schematic structural diagram of Embodiment 3 of a virtual machine kernel protection apparatus according to the present invention. As shown in FIG. 8, based on FIG. 7, the apparatus may further include an application module 801, configured to: before the copying unit 701 copies the file of the original kernel of the virtual machine to obtain the image file, apply for a buffer in the nonpaged pool of the original kernel of the virtual machine, where the shadow kernel is constructed in the buffer.

Further, the first redirection unit 703 is configured to repair the to-be-redirected data in the initial code of the shadow kernel according to a formula $D_{actual}-$ $D_{actual\_imagebase} = D_{default} - D_{default\_imagebase}$, to obtain the repaired to-be-redirected data, where $D_{default}$ is an address of the to-be-redirected data, $D_{actual\_imagebase}$ is a starting address of the buffer, $D_{default\_imagebase}$ is the base address of the shadow kernel, and $D_{actual}$ is an address of the repaired to-be-redirected data.

Figure 9:
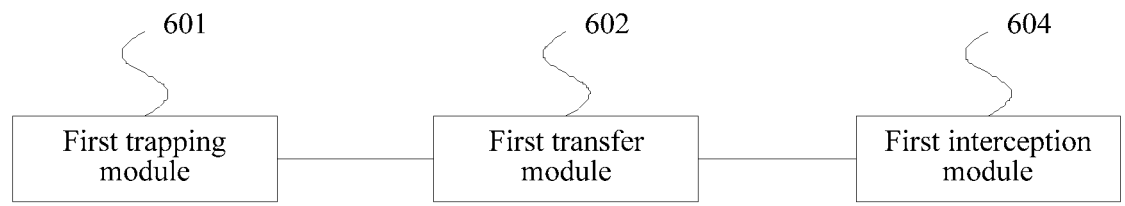
FIG. 9 is a schematic structural diagram of Embodiment 4 of a virtual machine kernel protection apparatus according to the present invention.

FIG. 9 is a schematic structural diagram of Embodiment 4 of a virtual machine kernel protection apparatus according to the present invention. As shown in FIG. 9, based on FIG. 6, the apparatus may further include a first interception module 604, configured to intercept a read/write operation performed by the application program on an SSDT in the original kernel of the virtual machine. Certainly, the apparatus may include the first interception module 604 based on FIG. 7 or FIG. 8. This is not shown herein.

Further, the SSDT in the original kernel of the virtual machine includes a correspondence between an identifier of the system call function and an entry address of the system call function in the original kernel of the virtual machine, and the shadow SSDT includes a correspondence between the identifier of the system call function and the entry address of the system call function in the shadow kernel; and correspondingly, the first transfer module 602 is specifically configured to determine the corresponding entry address of the system call function in the shadow kernel based on the correspondence between the identifier of the system call function in the shadow SSDT and the entry address of the system call function in the shadow kernel.

Figure 10:
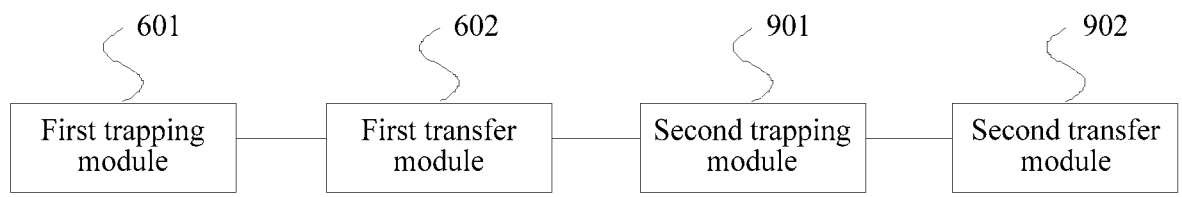
FIG. 10 is a schematic structural diagram of Embodiment 5 of a virtual machine kernel protection apparatus according to the present invention.

FIG. 10 is a schematic structural diagram of Embodiment 5 of a virtual machine kernel protection apparatus according to the present invention. As shown in FIG. 10, based on FIG. 6, the apparatus may further include a second trapping module 901 and a second transfer module 902. Certainly, the apparatus may include the second trapping module 901 and the second transfer module 902 based on any one of FIG. 7 to FIG. 9. This is not shown herein.

The second trapping module 901 is configured to trap an interrupt handling function of the virtual machine.

The second transfer module 902 is configured to: point the interrupt handling function to the shadow kernel based on the offset value between the base address of the original kernel and the base address of the shadow kernel, and determine a corresponding entry address of the interrupt handling function in the shadow kernel based on the shadow IDT in the shadow kernel.

Figure 11:
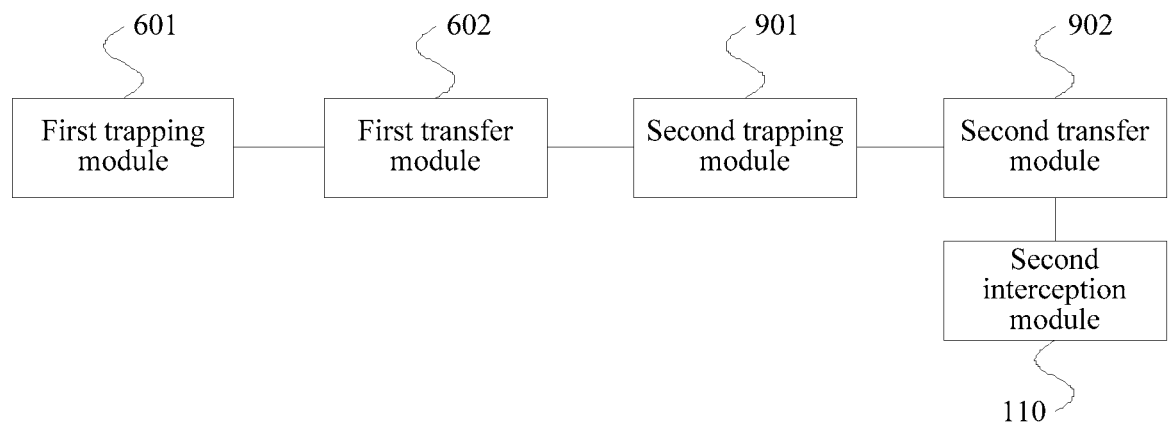
FIG. 11 is a schematic structural diagram of Embodiment 6 of a virtual machine kernel protection apparatus according to the present invention.

FIG. 11 is a schematic structural diagram of Embodiment 5 of a virtual machine kernel protection apparatus according to the present invention. As shown in FIG. 11, based on FIG. 10, the apparatus may further include a second interception module 110, configured to intercept a read/write operation performed by the application program on an IDT in the original kernel of the virtual machine.

Further, the IDT in the original kernel of the virtual machine includes a correspondence between an identifier of the interrupt handling function and an entry address of the interrupt handling function in the original kernel of the virtual machine, and the shadow IDT includes a correspondence between the identifier of the interrupt handling function and the entry address of the interrupt handling function in the shadow kernel; and correspondingly, the second transfer module 902 is specifically configured to determine the corresponding entry address of the interrupt handling function in the shadow kernel based on the correspondence between the identifier of the interrupt handling function in the shadow IDT and the entry address of the interrupt handling function in the shadow kernel.

The foregoing modules and units may be implemented by a processing element of the virtual machine kernel protection apparatus, and the processing element may be a processing element that is independently disposed, or may be a processing element that is integrated into the virtual machine kernel protection apparatus. In addition, the foregoing modules and units may be stored in a storage element of the virtual machine kernel protection apparatus in a form of program code, and are invoked by a processing element in the virtual machine kernel protection apparatus to perform the foregoing functions.

The apparatus is configured to perform the foregoing method embodiments. Their implementation principles and technical effects are similar, and details are not described herein again.

Figure 12:
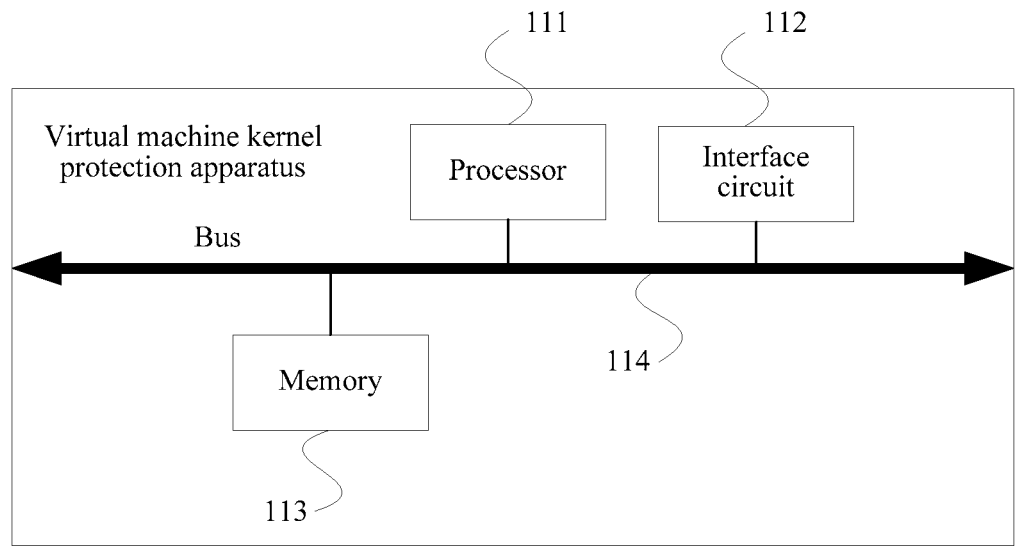
FIG. 12 is a schematic structural diagram of Embodiment 7 of a virtual machine kernel protection apparatus according to the present invention.

FIG. 12 is a schematic structural diagram of Embodiment 7 of a virtual machine kernel protection apparatus according to the present invention. As shown in FIG. 12, the apparatus includes: a processor 111, an interface circuit 112, a memory 113, and a bus 114. The processor 111, the interface circuit 112, and the memory 113 are connected and communicate with each other by using the bus 114. The memory 113 stores a set of program code. The processor 111 invokes the program code stored in memory 113 to perform the following operations:

trapping a system call function initiated by an application program; and pointing the system call function to a shadow kernel based on an offset value between a base address of an original kernel of a virtual machine and a base address of the shadow kernel, and determining a corresponding entry address of the system call function in the shadow kernel based on a shadow system service descriptor table SSDT in the shadow kernel.

The shadow kernel is constructed in a nonpaged pool of the original kernel of the virtual machine, and the shadow kernel is executable kernel code constructed based on an image file of the original kernel of the virtual machine.

Further, the processor 111 is further configured to construct the shadow kernel.

That the processor 111 constructs the shadow kernel is specifically: copying a file of the original kernel of the virtual machine to obtain the image file;

mapping the image file to the nonpaged pool of the original kernel of the virtual machine based on an executable format file, to form initial code of the shadow kernel;

repairing to-be-redirected data in the initial code of the shadow kernel based on an address mapped to the image file and the base address of the shadow kernel, to obtain repaired to-be-redirected data;

backing up data corresponding to an SSDT and data corresponding to a shadow interrupt descriptor table IDT in the repaired to-be-redirected data, to obtain the shadow IDT and the shadow SSDT; and redirecting the repaired to-be-redirected data to the original kernel of the virtual machine to obtain target to-be-redirected data, and replacing an SSDT and an IDT in the target to-be-redirected data with the shadow SSDT and the shadow IDT.

In some embodiments, before copying the file of the original kernel of the virtual machine to obtain the image file, the processor 111 applies for a buffer in the nonpaged pool of the original kernel of the virtual machine, where the shadow kernel is constructed in the buffer.

That the processor 111 repairs the to-be-redirected data in the initial code of the shadow kernel according to the address mapped to the image file and the base address of the shadow kernel, to obtain the repaired to-be-redirected data may be:

repairing the to-be-redirected data in the initial code of the shadow kernel according to a formula $D_{actual} - D_{actual\_imagebase} = D_{default} - D_{default\_imagebase}$, to obtain the repaired to-be-redirected data, where $D_{default}$ is an address of the to-be-redirected data, $D_{actual\_imagebase}$ is a starting address of the buffer, $D_{default\_imagebase}$ is the base address of the shadow kernel, and $D_{actual}$ is an address of the repaired to-be-redirected data.

After pointing the system call function to the shadow kernel, the processor 111 is further configured to intercept a read/write operation performed by the application program on an SSDT in the original kernel of the virtual machine.

The SSDT in the original kernel of the virtual machine includes a correspondence between an identifier of the system call function and an entry address of the system call function in the original kernel of the virtual machine, and the shadow SSDT includes a correspondence between the identifier of the system call function and the entry address of the system call function in the shadow kernel; and correspondingly, the processor 111 is specifically configured to determine the corresponding entry address of the system call function in the shadow kernel based on the correspondence between the identifier of the system call function in the shadow SSDT and the entry address of the system call function in the shadow kernel.

Further, the processor 111 is further configured to: trap an interrupt handling function of the virtual machine; and point the interrupt handling function to the shadow kernel based on the offset value between the base address of the original kernel and the base address of the shadow kernel, and determine a corresponding entry address of the interrupt handling function in the shadow kernel based on the shadow IDT in the shadow kernel.

After pointing the interrupt handling function to the shadow kernel, the processor 111 is further configured to intercept a read/write operation performed by the application program on an IDT in the original kernel of the virtual machine.

In some embodiments, the IDT in the original kernel of the virtual machine includes a correspondence between an identifier of the interrupt handling function and an entry address of the interrupt handling function in the original kernel of the virtual machine, and the shadow IDT includes a correspondence between the identifier of the interrupt handling function and the entry address of the interrupt handling function in the shadow kernel; and correspondingly, the processor 111 is specifically configured to determine the corresponding entry address of the interrupt handling function in the shadow kernel based on the correspondence between the identifier of the interrupt handling function in the shadow IDT and the entry address of the interrupt handling function in the shadow kernel.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one handling unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (English: processor) to perform a part of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

Finally, it should be noted that the foregoing embodiments are merely intended for describing technical solutions in accordance with the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the present disclosure.

What is claimed is:

1. A virtual machine kernel protection method, comprising:
   trapping a system call function initiated by an application program;
   pointing the system call function to a shadow kernel based on an offset value between a base address of an original kernel of a virtual machine and a base address of the shadow kernel;
   determining a corresponding entry address of the system call function in the shadow kernel based on a shadow system service descriptor table (SSDT) in the shadow kernel;
   repairing to-be-redirected data in initial code of the shadow kernel based on an address mapped to an image file of the original kernel of the virtual machine and the base address of the shadow kernel, to obtain repaired to-be-redirected data;
   backing up data corresponding to an SSDT and data corresponding to a shadow interrupt descriptor table (IDT) in the repaired to-be-redirected data, to obtain the shadow IDT and the shadow SSDT; and
   redirecting the repaired to-be-redirected data to the original kernel of the virtual machine to obtain target to-be-redirected data, and replacing an SSDT and an IDT in the target to-be-redirected data with the obtained shadow SSDT and the shadow IDT; and, wherein the shadow kernel is constructed in a nonpaged pool of the original kernel of the virtual machine, and the shadow kernel is executable kernel code constructed based on the image file of the original kernel of the virtual machine.

2. The method according to claim 1, wherein before the trapping a system call function initiated by an application program, the method further comprises:

constructing the shadow kernel.

3. The method according to claim 2, wherein the constructing the shadow kernel comprises:

copying a file of the original kernel of the virtual machine to obtain the image file;

mapping the image file to the nonpaged pool of the original kernel of the virtual machine based on an executable format file, to form initial code of the shadow kernel.

4. The method according to claim 3, wherein before the copying a file of the original kernel of the virtual machine to obtain the image file, the method further comprises:

applying for a buffer in the nonpaged pool of the original kernel of the virtual machine, wherein the shadow kernel is constructed in the buffer.

5. The method according to claim 4, wherein repairing to-be-redirected data in the initial code of the shadow kernel based on an address mapped to the image file and the base address of the shadow kernel, to obtain repaired to-be-redirected data comprises:

repairing the to-be-redirected data in the initial code of the shadow kernel according to a formula $D_{actual} - D_{actual\_imagebase} = D_{default} - D_{default\_imagebase}$, to obtain the repaired to-be-redirected data, wherein $D_{default}$ is an address of the to-be-redirected data, $D_{actua\_imagebase}$ is a starting address of the buffer, $D_{default\_imagebase}$ is the base address of the shadow kernel, and $D_{actual}$ is an address of the repaired to-be-redirected data.

6. The method according to claim 3, wherein the shadow SSDT comprises a correspondence between an identifier of the system call function and the entry address of the system call function in the shadow kernel; and correspondingly, determining a corresponding entry address of the system call function in the shadow kernel based on a shadow SSDT in the shadow kernel comprises:

determining the corresponding entry address of the system call function in the shadow kernel based on the correspondence between the identifier of the system call function in the shadow SSDT and the entry address of the system call function in the shadow kernel.

7. The method according to claim 1, wherein after pointing the system call function to a shadow kernel, the method further comprises:

intercepting a read/write operation performed by the application program on an SSDT in the original kernel of the virtual machine.

8. The method according to claim 1, wherein the method further comprises:

trapping an interrupt handling function of the virtual machine;

pointing the interrupt handling function to the shadow kernel based on the offset value between the base address of the original kernel and the base address of the shadow kernel; and determining a corresponding entry address of the interrupt handling function in the shadow kernel based on a shadow IDT in the shadow kernel.

9. The method according to claim 8, wherein after the pointing the interrupt handling function to the shadow kernel, the method further comprises:

intercepting a read/write operation performed by the application program on an IDT in the original kernel of the virtual machine.

10. The method according to claim 8, wherein the shadow IDT comprises a correspondence between an identifier of the interrupt handling function and the entry address of the interrupt handling function in the shadow kernel; and, wherein, determining a corresponding entry address of the interrupt handling function in the shadow kernel based on the shadow IDT in the shadow kernel comprises:

determining the corresponding entry address of the interrupt handling function in the shadow kernel based on the correspondence between the identifier of the interrupt handling function in the shadow IDT and the entry address of the interrupt handling function in the shadow kernel.

11. A virtual machine kernel protection apparatus, comprising:

at least one processor; and a non-transitory computer-readable storage medium coupled to the at least one processor and storing programming instructions for execution by the at least one processor, the programming instructions, when executed, instruct the at least one processor to perform the following operations:

trapping a system call function initiated by an application program;

pointing the system call function to a shadow kernel based on an offset value between a base address of an original kernel of a virtual machine and a base address of the shadow kernel;

determining a corresponding entry address of the system call function in the shadow kernel based on a shadow system service descriptor table SSDT in the shadow kernel;

repairing to-be-redirected data in initial code of the shadow kernel based on an address mapped to an image file of the original kernel of the virtual machine and the base address of the shadow kernel, to obtain repaired to-be-redirected data;

backing up data corresponding to an SSDT and data corresponding to a shadow interrupt descriptor table (IDT) in the repaired to-be-redirected data, to obtain the shadow IDT and the shadow SSDT; and redirecting the repaired to-be-redirected data to the original kernel of the virtual machine to obtain target to-be-redirected data, and replacing an SSDT and an IDT in the target to-be-redirected data with the obtained shadow SSDT and the shadow IDT; and, wherein the shadow kernel is constructed in a nonpaged pool of the original kernel of the virtual machine, and the shadow kernel is executable kernel code constructed based on the image file of the original kernel of the virtual machine.

12. The apparatus according to claim 11, wherein the programming instructions further instruct the at least one processor to perform the following operation steps:

constructing the shadow kernel.

13. The apparatus according to claim 12, wherein the programming instructions further instruct the at least one processor to perform the following operation steps:
 copying a file of the original kernel of the virtual machine to obtain the image file;
 mapping the image file to the nonpaged pool of the original kernel of the virtual machine based on an executable format file, to form initial code of the shadow kernel.

14. The apparatus according to claim 13, wherein the programming instructions further instruct the at least one processor to perform the following:
 applying for a buffer in the nonpaged pool of the original kernel of the virtual machine, wherein the shadow kernel is constructed in the buffer.

15. The apparatus according to claim 14, wherein the programming instructions further instruct the at least one processor to perform the following operation steps:
 repairing the to-be-redirected data in the initial code of the shadow kernel according to a formula $D_{actual} - D_{actual\_imagebase} = D_{default} - D_{default\_imagebase}$, to obtain the repaired to-be-redirected data,
 wherein $D_{default}$ is an address of the to-be-redirected data, $D_{actual\_imagebase}$ is a starting address of the buffer, $D_{default\_imagebase}$ is the base address of the shadow kernel, and $D_{actual}$ is an address of the repaired to-be-redirected data.

16. The apparatus according to claim 13, wherein the shadow SSDT comprises a correspondence between an identifier of the system call function and the entry address of the system call function in the shadow kernel; and, wherein,
 the programming instructions further instruct the at least one processor to perform the following operation steps:
 determining the corresponding entry address of the system call function in the shadow kernel based on the correspondence between the identifier of the system call function in the shadow SSDT and the entry address of the system call function in the shadow kernel.

17. The apparatus according to claim 11, wherein the programming instructions further instruct the at least one processor to perform the following operation steps:
 intercepting a read/write operation performed by the application program on an SSDT in the original kernel of the virtual machine.

18. The apparatus according to claim 11, wherein the programming instructions further instruct the at least one processor to perform the following operation steps:
 trapping an interrupt handling function of the virtual machine;
 pointing the interrupt handling function to the shadow kernel based on the offset value between the base address of the original kernel and the base address of the shadow kernel; and
 determining a corresponding entry address of the interrupt handling function in the shadow kernel based on a shadow IDT in the shadow kernel.

19. The apparatus according to claim 18, wherein the programming instructions further instruct the at least one processor to perform the following:
 intercepting a read/write operation performed by the application program on an IDT in the original kernel of the virtual machine.

20. The apparatus according to claim 18, wherein the shadow IDT comprises a correspondence between an identifier of the interrupt handling function and the entry address of the interrupt handling function in the shadow kernel; and, wherein determining the corresponding entry address of the interrupt handling function in the shadow kernel based on the correspondence between the identifier of the interrupt handling function in the shadow IDT and the entry address of the interrupt handling function in the shadow kernel.

* * * * *